Figure 1:
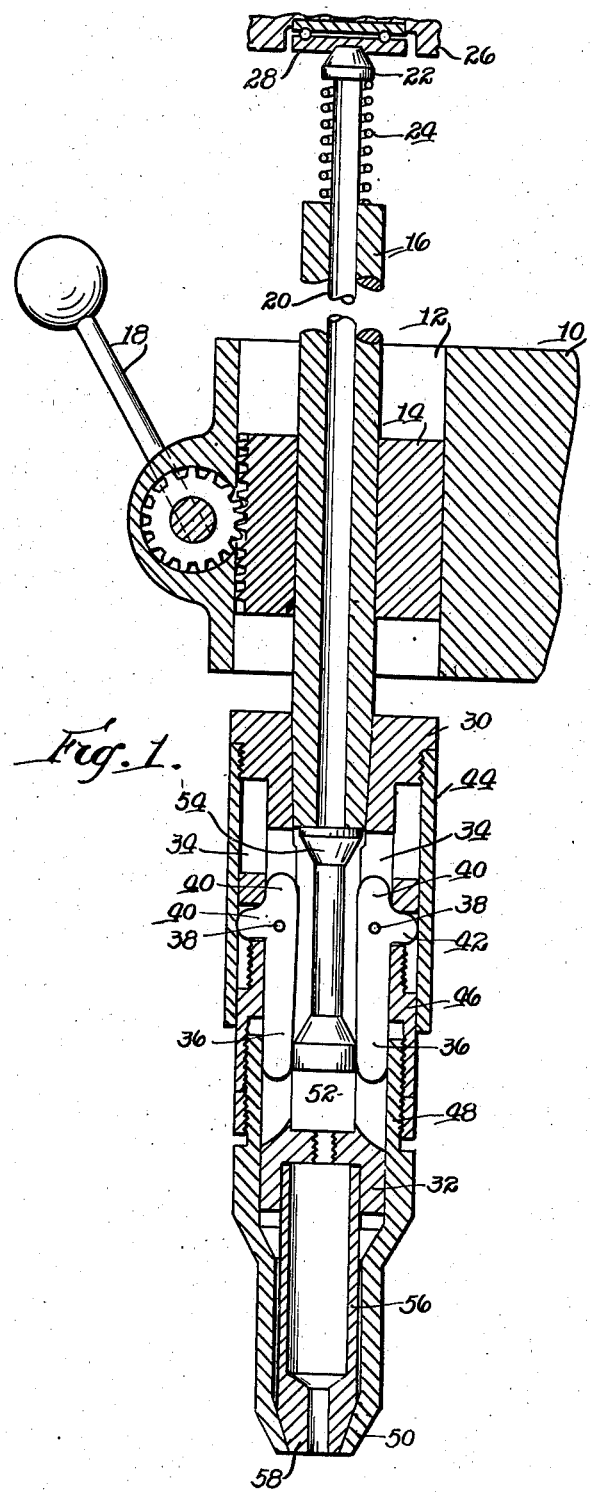

Nov. 9, 1948.   E. ROY   2,453,642
AUTOMATIC CHUCK
Filed Aug. 18, 1947

INVENTOR.
Emil Roy.
BY
Attorney.

Patented Nov. 9, 1948

2,453,642

UNITED STATES PATENT OFFICE 2,453,642

AUTOMATIC CHUCK

Emil Roy, Webster, Mass.

Application August 18, 1947, Serial No. 769,513

6 Claims. (Cl. 279—51)

This invention relates to automatic chucks particularly adapted for holding either tools or workpieces.

The principal object of the invention resides in the provision of an automatic chuck which grips a tool or workpiece upon being moved in one direction and releases the tool or workpiece upon being moved in the other direction; the provision of an automatic chuck having a chucking element which is normally open to receive or release tools and workpieces and including an element movable with respect thereto for closing the chuck to grip tools or workpieces and including means operating the same for producing the opening and closing of the chucking member automatically upon movement of a handle or similar means which is primarily used for moving the tool to and from working position.

Further objects of the invention include the provision of a tubular member movable by a handle and containing a rod axially movable therein, said rod being normally pressed in one direction with respect thereto by any means, such as a spring, air power, etc., said rod having at an end thereof a pair of spaced actuating elements to selectively contact levers to swing the levers in opposite directions, said levers thereby moving an actuating member for closing a chucked element or for allowing the latter to open depending upon the direction of movement of the tubular member; and the provision of a device as aforesaid including a fixed abutment for contacting the rod and moving the same in a direction opposite to the movement imparted thereto by spring, air means, etc.

Other objects and advantages of the invention will appear hereinafter.

Reference is to be had to the accompanying drawing in which the figure represents a sectional view through a device according to the invention.

As shown in the drawing the reference numeral 10 indicates a fixed part of a machine having a bore at 12 slidably receiving a collar 14 to which is fixed a tubular member 16. The collar 14 is moved in the bore 12 by means of a handle 18.

The tubular member 16 receives a rod 20 slidable axially therein and having at one end an extending head 22 against which a compression spring 24 works so as to normally move rod 20 in a direction outwardly of the tubular member 16. A fixed abutment 26 is provided with a thrust bearing 28 for contact with head 22 so as to move the rod 20 in the opposite direction against the action of spring 24 when the tubular member 16 is raised by the handle 18 to contact the thrust bearing 28.

At the lower end of the tubular member 16 there is provided a head 30 which extends downwardly terminating in a portion 32. Between the head 30 and the portion 32 this head is provided with a plurality of axially extending radially arranged slots 34 in each of which there is pivotally mounted a lever 36 on a pin 38, the latter being closer to one end 40 of each of the levers than to the opposite end and adjacent the pins 38 there is provided on each lever a radially outwardly extending portion 42. A cylindrical cover member 44 is secured to head 30 and depends downwardly forming a guideway with head 30 for an axially slidable member 46 having a screw threaded adjustment connection with a cylindrical member 48, the latter terminating in an open tapering end 50.

The rod 20 terminates in a generally conical abutment 52 and inwardly of the abutment 22 there is disposed in fixed relation thereto a similar but opposed abutment 54. In normal condition the levers 36 will lie between these two abutments and in the path thereof.

The portion 32 of the head 30 is provided with a collet chuck or similar device 56 having split fingers 58. These fingers 58 are provided on their outer surfaces with an inclined conformation complementary to the interior angularity of the tip end 50 of member 48. It will be clear that if member 48 is brought upwardly with respect to the head 30, the collet fingers 58 will close to grip a tool or a workpiece but when the member 48 is dropped down it will release fingers 58 allowing the same to open due to the inherent resilience of the collet fingers. The closing action is extremely powerful due to the many multiplications of leverage from rod 20 to the tip end 50.

In the drawing the device is shown with the collet fingers 58 closed, the lower ends of levers 36 being swung outwardly to their furthest extent by reason of the position of the abutment 52 which is in raised position. When the head 22 strikes the thrust bearing 28, rod 20 will be lowered relative to the tubular member 16 thus bringing abutment 52 down out of the way of the levers 36 and bringing abutment 54 downwardly sufficient to contact the ends 40 of the levers, thus swinging the levers in the opposite direction so that the outwardly extending portions 42 force element 16 and, therefore, element 48 downwardly relative to the head 32 and relative to the collet fingers 58, thus allowing the latter to expand and release whatever was held in the collet fingers. In this position, of course, the entire device is in its uppermost position and if it is a drill, for instance, that is being held in the collet it will fall out or the operator merely has to give it a little pull to remove it and a new drill or other tool or even a workpiece may be then thrust into the space between the collet fingers, whereupon handle 18 is actuated to bring the collar 14 and tube 16 downwardly, the spring 24 (or other means) then withdrawing rod 20 as far as possible upwardly relative to the tubular member 16. When this happens the abutment 52 will engage the lower ends of lever 36 and force them outwardly raising element 46 and 48 relative to the head 30 so as to engage the collet fingers 58 by means of the tapered end 50, thus squeezing the collet fingers and gripping whatever has been placed between them.

It will be seen that this invention provides a relatively uncomplicated automatic chucking device which may be used for production work with workpieces or with tools of a size to be taken by the collet fingers.

Having thus described my invention and the advantages thereof, I do not wish to be limited to the details herein disclosed otherwise than as set forth in the claims, but what I claim is:

1. A device of the class described comprising a movable member, means to move the member, an element movable with respect to the member, a pair of spaced cams on the element, a head fixed to the member and receiving the element, a plurality of levers pivoted in said head and lying substantially between the cams in the paths thereof as the element is moved relative to the member, a plurality of compressible holding fingers on the head, a sliding finger actuator on the head, and means to slide the actuator upon pivotal movement of the levers.

2. A device of the class described comprising a rotatable and axially movable elongated member, a head thereon, holding fingers on the head, a finger actuator axially movable on the head, an element axially movable with respect to the member, means on the head to move the finger actuator, means on the element to operate said first named means as the element is moved relative to the member, means to constantly urge the element in one direction relative to the member, and an abutment to move the element in the opposite direction.

3. A device of the class described comprising a rotatable and axially movable elongated member, a head thereon, holding fingers on the head, a finger actuator axially movable on the head, an element axially movable with respect to the member, means on the head to move the finger actuator, means on the element to operate said first named means as the element is moved relative to the member, means to constantly urge the element in one direction relative to the member, and an abutment to move the element in the opposite direction, said first named means comprising a radially swinging lever, and a connection between the lever and the finger actuator.

4. A device of the class described comprising a rotatable and axially movable elongated member, a head thereon, holding fingers on the head, a finger actuator axially movable on the head, an element axially movable with respect to the member, means on the head to move the finger actuator, means on the element to operate said first named means as the element is moved relative to the member, means to constantly urge the element in one direction relative to the member, and an abutment to move the element in the opposite direction, said first named means comprising a radially swinging lever, and a connection between the lever and the finger actuator, said second named means comprising a pair of spaced cams arranged oppositely on the element, the lever lying in the path thereof.

5. A device of the class described comprising a rotary and axially movable tubular member, an axially slidable rod therein, resilient means urging the rod in one direction relative to the member, the rod extending at both ends from the latter, a pair of spaced cams on the rod at locations exterior of the member, a head secured to the member, a plurality of levers pivoted on the head in the path of the cams, an axially slidable actuator connected to the levers for movement thereby as the levers swing under influence of the cams, and a gripping chuck member operated by the slidable actuator.

6. The device of claim 5 including a fixed abutment for contact with the rod to move the same in a direction opposite to the movement imparted thereto by the resilient means.

EMIL ROY.

REFERENCES CITED

The following references are of record in the file of this patent:

UNITED STATES PATENTS

| Number | Name | Date |
|---|---|---|
| 370,604 | Cahill | Sept. 27, 1887 |
| 547,643 | Krug | Oct. 8, 1895 |
| 728,572 | Hanson | May 19, 1903 |
| 1,116,556 | Brightman | Nov. 10, 1914 |